(12) United States Patent
Bruschelli et al.

(10) Patent No.: US 12,528,314 B2
(45) Date of Patent: Jan. 20, 2026

(54) MOTORCYCLE TYRE

(71) Applicant: Pirelli Tyre S.p.A., Milan (IT)

(72) Inventors: Luca Bruschelli, Milan (IT); Nicola Forconi, Macerata (IT); Mario Mariani, Milan (IT); Matteo Torchiana, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 219 days.

(21) Appl. No.: 17/755,334

(22) PCT Filed: Nov. 3, 2020

(86) PCT No.: PCT/IB2020/060287
§ 371 (c)(1),
(2) Date: Apr. 27, 2022

(87) PCT Pub. No.: WO2021/090152
PCT Pub. Date: May 14, 2021

(65) Prior Publication Data
US 2022/0410627 A1 Dec. 29, 2022

(30) Foreign Application Priority Data
Nov. 4, 2019 (IT) .................. 102019000020310

(51) Int. Cl.
*B60C 11/00* (2006.01)
*B60C 1/00* (2006.01)
(Continued)

(52) U.S. Cl.
CPC ........ *B60C 11/0008* (2013.01); *B60C 1/0016* (2013.01); *B60C 11/005* (2013.01);
(Continued)

(58) Field of Classification Search
CPC .............. B60C 2200/10; B60C 11/0008
See application file for complete search history.

(56) References Cited

U.S. PATENT DOCUMENTS

| | | | |
|---|---|---|---|
| 2010/0212799 A1* | 8/2010 | Kasai | ............ B60C 11/005 152/454 |
| 2012/0252915 A1* | 10/2012 | Maesaka | ............ C08J 9/103 521/94 |

(Continued)

FOREIGN PATENT DOCUMENTS

| | | |
|---|---|---|
| CN | 108290452 A | 7/2018 |
| CN | 108430799 A | 8/2018 |

(Continued)

OTHER PUBLICATIONS

International Search Report form the European Patent Office in corresponding International Application No. PCT/IB2020/060287 mailed Feb. 9, 2021.

(Continued)

*Primary Examiner* — Cedrick S Williams
(74) *Attorney, Agent, or Firm* — Finnegan, Henderson, Farabow, Garrett & Dunner, L.L.P.

(57) ABSTRACT

A motorcycle tyre (1) is described comprising an equatorial plane (X-X) and a tread band (8) comprising a radially inner portion (13) and a radially outer portion (11) respectively comprising a first and a second vulcanized elastomeric material obtained by vulcanizing respective elastomeric materials comprising 100 phr of at least one elastomeric diene polymer, from 30 to 130 phr of at least one reinforcing filler comprising an amount greater than 75% or, respectively, equal to or greater than 80% of a white filler. In the tyre (1) the ratio R1 between the dynamic elastic modulus (E') and the tandelta measured at a frequency of 10 Hz and at 70° C. of the first vulcanized elastomeric material is comprised between 27 and 35, whereas the ratio R2 between the dynamic elastic modulus (E') and the tandelta measured at a frequency of 10 Hz and at 70° C. of the second (Continued)

vulcanized elastomeric material is comprised between 15 and 30, the ratio R1/R2 being greater than or equal to 1.1.

16 Claims, 3 Drawing Sheets

(51) Int. Cl.
- *C08K 3/22* (2006.01)
- *C08K 3/26* (2006.01)
- *C08K 3/34* (2006.01)
- *C08K 3/36* (2006.01)
- *C08L 9/00* (2006.01)
- *B60C 11/03* (2006.01)

(52) U.S. Cl.
CPC .............. *C08K 3/22* (2013.01); *C08K 3/26* (2013.01); *C08K 3/346* (2013.01); *C08K 3/36* (2013.01); *C08L 9/00* (2013.01); *B60C 2011/0025* (2013.01); *B60C 2011/0358* (2013.01); *B60C 2011/0374* (2013.01); *B60C 2200/10* (2013.01); *C08K 2003/2241* (2013.01); *C08K 2003/265* (2013.01)

(56) References Cited

U.S. PATENT DOCUMENTS

| | | | |
|---|---|---|---|
| 2013/0167993 A1* | 7/2013 | Otani | B60C 11/00 152/209.1 |
| 2014/0182757 A1 | 7/2014 | Mariani et al. | |
| 2021/0179821 A1* | 6/2021 | Galimberti | C08L 23/22 |

FOREIGN PATENT DOCUMENTS

| | | | |
|---|---|---|---|
| JP | 2006273240 A | * | 10/2006 |
| WO | WO 2015/097582 A1 | | 7/2015 |
| WO | WO 2017/064585 A1 | | 4/2017 |
| WO | WO 2019/082012 A1 | | 5/2019 |

OTHER PUBLICATIONS

Written Opinion of the International Searching Authority from the European Patent Office in corresponding International Application No. PCT/IB2020/060287 mailed Feb. 9, 2021.

\* cited by examiner

MOTORCYCLE TYRE

This application is a national stage filing under 35 U.S.C. § 371 of International Application No. PCT/IB2020/060287, filed on 3, 2020, which claims the benefit of priority to Italian Application No. 102019000020310, filed on Nov. 4, 2019; the disclosure of each of these applications are each incorporated herein by reference in their entirety.

FIELD OF THE INVENTION

The present invention relates to a motorcycle tyre.

In particular, the present invention relates to a motorcycle tyre of the "Supersport" and/or "Sport Touring" segment, of large displacement (for example 600 cm$^3$ or more), and/or high power (for example 100 horsepower or more), also used on track.

Even more particularly, the present invention relates to a high-performance tyre intended to be fitted on the rear wheel of motorcycles, in other words a tyre capable of sustaining maximum speeds of at least about 210 km/h or supporting maximum loads of at least about 210 kg or a combination of both.

RELATED ART

Motorcycle tyres are known for example from WO 2015/097582 and from WO 2019/082012 in the name of the Applicant.

In WO 2017/064585 in the name of the Applicant a motorcycle tyre is described having a low void-to-rubber ratio, which provides a stiffness suitable for having good performance on dry ground and on track, and a tread band with grooves arranged so as to provide a draining effect with structurally weakening the tread band. The tread pattern is further provided with two groove pairs having segments or portions configured and arranged so as to produce a warming effect when the compound of the tread band is cold, typically at the start of a tyre use or in wet conditions, and to provide grip to the ground and limited local warming when the compound of the tread band is at the operating temperature or when driving on dry ground, so as to provide stiffness and readiness of response.

SUMMARY OF THE INVENTION

In recent times a trend has been observed to introduce in the market motorcycles for Supersport or Sport Touring use having high power. As a matter of fact, on the market are, for example, present motorcycles for road use having a displacement of 1000 cm$^3$ or higher, with powers of 180 horsepower or even higher.

The Applicant has noted an increasing demand for use of such Supersport motorcycles, both on road and on track.

At the same time, the Applicant has noted an increasing demand for high performance tyres both for demanding sports driving (which may achieved, for example, on track), and in terms of lifetime and handling in any atmospheric and seasonal condition (for road use of the motorcycle throughout the year).

In this concern, the Applicant has in particular observed a recent trend of the users wishing to find in the tyres that are fitted in Supersport motorcycles, a handling performance and a performance in conditions of extreme speed and maneuvers in on dry and/or hot ground together with features of handling and road holding in wet and/or in cold conditions or in non-optimal road surface conditions, as well as an ever increasing lifetime to reduce the frequency of tyre change.

Satisfying such mutually contrasting requirements with a single pair of tyres is a particularly demanding task insofar as a different intervention is typically adopted for each of the above requirements, applying solutions suited for the specific problem, but in contrast with the others.

The Applicant has for example noted that in tread rubber compounds intended for high-performance tyres (racing tyres) in dry conditions and/or at high temperatures substantial amounts of carbon black filler are used, whereas for rubber compounds intended for treads having a main use in wet and/or low temperature conditions the choice of the fillers is typically oriented towards so-called white fillers, such as for example silica and silicates.

In order to try to meet the aforementioned contrasting requirements with a single pair of tyres, tyres have been proposed having tread bands made of different compounds, typically a rubber compound with a higher content of carbon black filler at the shoulder and several rubber compounds with a higher content of white fillers at the crown and at intermediate annular portions of the tread band, all this in combination with a suitable distribution and positioning of the grooves of the tread band at the interface between rubber compounds of different composition, as described, for example, in WO 2019/082012 in the name of the Applicant.

Finally, the Applicant has also observed that rigid tyre structures, typical for use on track where the tyres are deflated even by many tenths of bar with respect to the pressure recommended by the manufacturer, to have a greater ground-contacting area so as to be able to have an adequate readiness to extreme maneuvers seem not very appropriate for road use in which the tyre inflated to the pressure recommended by the manufacturer is required to provide comfort, road holding and ability to absorb stresses on different road surfaces.

In its search for a further improvement of the handling and road holding characteristics of the tyre in wet and/or cold climate conditions or on a non-optimal road surface, the Applicant has surprisingly found that it is possible to achieve such a further improvement maintaining or even substantially improving at the same time the handling and road holding characteristics of the tyre in conditions of extreme speed and maneuvering on dry and/or hot ground, by acting on the rigidity characteristics of the tread band of the tyre, in particular on the rigidity characteristics of a radially inner portion of a tread band having a so-called "cap-and-base" structure.

This objective has been surprisingly achieved by using rubber compounds having a high content of white fillers, such as for example silica and silicates, in radially inner and radially outer portions of the tread band.

In particular, the Applicant has found that the aforementioned desired characteristics of the tyre can be achieved if the radially superimposed portions of the tread band having a high content of white fillers possess specific dynamic mechanical properties measured at a frequency of 10 Hz and at a temperature of 70° C.

Maintaining or even improving the handling characteristics and performance of the tyre in extreme speed and maneuvering conditions on dry and/or hot ground appears to be surprising since a tread band made entirely with elastomeric materials having a high content of white fillers (such as for example silica, silicates etc.), typical for uses in wet and cold climates, did not appear to be suitable for providing a good performance in sports driving on a dry and/or hot road surface.

More particularly, the invention relates to a motorcycle tyre comprising an equatorial plane and a tread band comprising:

a radially inner portion comprising a first vulcanized elastomeric material obtained by vulcanizing an elastomeric material comprising 100 phr of at least one elastomeric diene polymer, from 30 to 130 phr of at least one reinforcing filler comprising an amount greater than 75% by weight of the total weight of the reinforcing fillers, of an inorganic material selected from silica, alumina, silicates, hydrotalcite, calcium carbonate, kaolin, titanium dioxide and mixtures thereof;

a radially outer portion comprising a second vulcanized elastomeric material obtained by vulcanizing an elastomeric material comprising for 100 phr of at least one elastomeric diene polymer, from 30 to 130 phr of at least one reinforcing filler comprising an amount equal to or greater than 80% by weight of the total weight of the reinforcing fillers, of an inorganic material selected from silica, alumina, silicates, hydrotalcite, calcium carbonate, kaolin, titanium dioxide and mixtures thereof;

wherein:

the ratio R1 between the dynamic elastic modulus (E') and the tandelta measured at a frequency of 10 Hz and at 70° C. of the first vulcanized elastomeric material is comprised between 27 and 35;

the ratio R2 between the dynamic elastic modulus (E') and the tandelta measured at a frequency of 10 Hz and at 70° C. of the second vulcanized elastomeric material is comprised between 15 and 30; and wherein the ratio R1/R2 is greater than or equal to 1.1.

The Applicant has experimentally found that by using a tread band of the so-called "cap-and-base" type having the aforementioned characteristics it is surprisingly possible to further improve the handling and road holding performance in wet and/or cold climate conditions or on a non-optimal road surface of a motorcycle tyre, in particular a motorcycle tyre of the "Supersport" and/or "Sport Touring" segment and, this, while substantially maintaining or even improving at the same time the handling performance and the tyre performance in conditions of extreme speed and maneuvering on dry and/or hot ground.

Without wishing to be bound by any interpretative theory, the Applicant deems that by controlling the ratio R1 between E' and tandelta of the first vulcanized elastomeric material and the ratio R1/R2 within the aforementioned range of values, it is possible to limit both the deformations (linked to the elastic modulus E') and hysteresis phenomena (linked to the tandelta parameter) of the radially inner layer of the tread band comprising this first material with an advantageous lower heat generation in conditions of extreme speed and maneuvers of the tyre on a dry and/or hot ground.

Surprisingly, this advantageous technical effect was observed even by using, in the first vulcanized elastomeric material, a large amount of white filler, notoriously not capable of effectively dissipating heat when the tyre is subjected to high thermal-mechanical stresses during sports driving on a dry and/or hot ground.

Moreover, this advantageous technical effect appears to be surprising also in light of the fact that a greater rigidity of the vulcanized elastomeric material (such as the rigidity of the radially inner portion with respect to that of the radially outer portion of the tread band of the tyre according to the invention) is deemed in the art as not being suitable for achieving the deformation ability of the elastomeric material necessary to have high grip with sports driving on a dry and/or hot ground.

Conversely, it has also been surprisingly observed by the Applicant that by using a large amount of white filler in the first vulcanized elastomeric material and by respecting the aforementioned ratios R1 and R2 between E' and tandelta of the first and second vulcanized elastomeric material of the tread band, it is possible to achieve the desired improved handling and road holding characteristics on wet ground and/or in cold climate conditions or on a non-optimal road surface.

For the purposes of the present invention, the dynamic mechanical properties E' and tandelta were measured using an Instron dynamic device model 1341 in the traction-compression mode according to the following methods.

A test piece of cross-linked material (170° C. for 10 minutes) having a cylindrical shape (length=25 mm; diameter=18 mm), preloaded under compression up to a longitudinal deformation of 25% with respect to the initial length and kept at a predetermined temperature (for example, 70° C.) for the entire duration of the test.

After a wait time of 2 minutes followed by a mechanical pre-conditioning of 125 cycles at 100 Hz at a 5% deformation amplitude with respect to the length under preload, the test piece was subjected to a dynamic sinusoidal stress having an amplitude of ±3.5% with respect to the length under preload, with a frequency of 10 Hz.

The dynamic mechanical properties are expressed in terms of values of dynamic elastic modulus (E') and tandelta (loss factor). The tandelta value was calculated as the ratio between the viscous dynamic modulus (E") and the elastic dynamic modulus (E').

For the purposes of the present invention, moreover, the following definitions apply:

By "tread pattern" it is meant the representation of each point of the tread band (grooves included) on a plane perpendicular to the equatorial plane of the tyre and tangent to the maximum diameter of the tyre.

Angular measurements, and/or linear quantities (distances, widths, lengths, etc.), and/or surface areas are to be intended as referred to the tread pattern as defined above.

Moreover, referring to the angular arrangement of the grooves formed in the tread band with respect to the equatorial plane of the tyre, such an angular arrangement is to be intended, for each point of the groove, as referred to the angle (comprised between 0° and 90° in absolute value) defined by a rotation made starting from the equatorial plane up to the direction tangent to the groove passing through that point.

By "average inclination" of a groove it is meant the arithmetical mean of the inclinations/angles of the portions forming the groove with respect to the equatorial plane of the tyre. For grooves with curvilinear course, the average inclination or average angle may be expressed as:

$$\frac{1}{L}\int_0^L \alpha(x)dx$$

where α(x) represents the angle of the groove at the longitudinal "height" x and L represents the groove development.

By "equatorial plane" of the tyre it is meant a plane perpendicular to the rotation axis of the tyre and dividing the tyre into two equal portions.

By "axial development" of the tread band or of portions thereof it is meant the development of the radially outermost profile of the tread band or of portions thereof in a cross section of the tread band taken in a plane containing the rotation axis of the tyre.

By "axial half-development" of the tread pattern, of the tread band or of portions thereof it is meant the development, from the equatorial plane and towards an axially outer end of the tyre, of the radially outermost profile of the tread band or of portions thereof in a cross section of the tyre taken in a plane containing the rotation axis of the tyre.

By "motorcycle tyre" it is meant a tyre having a high curvature ratio (typically greater than 0.2), capable of reaching high camber angles (for example 50°-60°) when the motorcycle runs along a bend.

By "circumferential" or "longitudinal" direction it is meant a direction generically directed according to the rotation direction of the tyre, or in any case only slightly inclined with respect to the rotation direction of the tyre.

By "curvature ratio" of the tyre it is meant the ratio between the distance of the radially highest point of the tread band from the maximum chord of the tyre, and the same maximum chord of the tyre, in a cross section of the tyre.

By "overall void to rubber ratio" it is meant the ratio between the total surface of the grooves of a certain annular portion of the tread band (possibly of the whole tread band) and the total surface of the whole tread band.

By annular portion it is meant a portion of the tread band circumferentially extending along the whole tread band and having a predetermined axial development (for example 10 mm).

The distance of an annular tread portion from the equatorial plane or the distance between annular portions is evaluated axially referring to the central plane parallel to the equatorial plane of the portion(s).

By "void to rubber ratio of an annular portion" or generically "void to rubber ratio" it is meant the ratio between the total surface of the grooves of an annular portion or of an annular region and the total surface of the annular portion itself or of the annular region itself.

By "longitudinal development" of a groove it is meant the development of the projection along the circumferential direction of the groove itself.

Unless specified otherwise, by "development" of a groove it is meant the length of the groove measured along the course thereof.

By block it is meant a solid portion of vulcanized elastomeric material that is arranged between axially adjacent and/or circumferentially consecutive grooves.

By "size" of the blocks defined between axially adjacent and/or circumferentially consecutive grooves it is meant the distance between facing edges of the aforementioned grooves. Such a size can for example be defined by the diameter of a circle tangent to the facing edges of axially adjacent and/or circumferentially consecutive grooves and inscribed between said grooves.

By "pitch" of the tyre it is meant the group of grooves and rubber parts arranged so as to form a portion of the pattern which is repeated on the tread band, substantially the same and without interruption along the circumferential development of the tread band. Along the circumferential development of the tread band, the pitches may have different circumferential lengths.

By "substantially longitudinal", referring to a groove, it is meant that such a groove is arranged at an average angle with respect to the equatorial plane of the tyre which is substantially zero (e.g. of less than 10°).

By "substantially curvilinear" course of a groove it is meant a course with substantial continuity of the derivative of the curve representing the course itself. Typically, this is achieved by means of a course without sharp points. The present definition also includes the cases in which the groove is formed by or comprises a sequence of short straight sections, provided that the difference in the angular arrangement of such sections is not too large (e.g. larger than 25°).

In the present description and in the following claims, all numerical entities indicating amounts, parameters, percentages and so forth are to be understood as being preceded in all instances by the term "about" unless indicated otherwise. Moreover, all of the ranges of numerical entities include all the possible combinations of the maximum and minimum numerical values and all the possible intermediate ranges, in addition to those specifically indicated hereinbelow.

Unless otherwise indicated, all of the ranges of numerical entities also include the maximum and minimum numerical values.

Within the framework of the present description and in the following claims, the term "phr" (acronym of parts per hundred parts of rubber) indicates the parts by weight of a given component of elastomeric compound per 100 parts by weight of the elastomeric polymer considered net of possible extender plasticizer oils.

The present invention can, in one or more of the aforementioned aspects, have one or more of the preferred features given hereinafter, which can be combined as desired according to the application requirements.

Preferably, the first vulcanized elastomeric material of the radially inner portion of the tread band is obtained by vulcanizing an elastomeric material comprising an amount equal to or greater than 80%, more preferably equal to or greater than 85%, even more preferably equal to or greater than 90%, and even more preferably equal to or greater than 95% by weight of the total weight of the reinforcing fillers of an inorganic material selected from silica, alumina, silicates, hydrotalcite, calcium carbonate, kaolin, titanium dioxide and mixtures thereof.

In this way, it is advantageously possible to achieve optimal handling and road holding characteristics of the tyre in wet and/or cold climate conditions or on a non-optimal road surface thanks to the ability of the radially inner portion of the tread band to accommodate the deformations of the tread band itself under the ground-contacting area.

Preferably, the second vulcanized elastomeric material of the radially outer portion of the tread band is obtained by vulcanizing an elastomeric material comprising an amount equal to or greater than 85%, even more preferably equal to or greater than 90%, and even more preferably equal to or greater than 95% by weight of the total weight of the reinforcing fillers of an inorganic material selected from silica, alumina, silicates, hydrotalcite, calcium carbonate, kaolin, titanium dioxide and mixtures thereof.

In this way, it is advantageously possible to achieve optimal handling and road holding characteristics of the tyre in wet and/or cold climate conditions or on a non-optimal road surface thanks to the ability of the radially outer portion of the tread band to achieve a high grip linked to the superficial chemical affinity of the white filler (for example silica) with the water present under the ground-contacting area.

Preferably, the ratio R1 between the dynamic elastic modulus (E') and the tandelta measured at a frequency of 10 Hz and at 70° C. of the first vulcanized elastomeric material is comprised between 27.5 and 32.5.

In this way and as outlined above, it is advantageously possible to impart to the radially inner portion of the tread band those controlled characteristics of rigidity and, at the same time, of hysteresis, so as to achieve the desired performance improvement of the tyre on a wet or cold surface, while maintaining or even improving at the same time the performance on dry or hot ground.

Preferably, the ratio R2 between the dynamic elastic modulus (E') and the tandelta measured at a frequency of 10 Hz and at 70° C. of the second vulcanized elastomeric material is comprised between 15 and 20.

In this way, it is advantageously possible to impart to the radially outer portion of the tread band the desired features of traction and drivability of the tyre both on wet or cold ground, and on dry or hot ground.

Preferably, the ratio R1/R2 is less than or equal to 2.0, preferably greater than or equal to 1.2 and less than or equal to 1.9 and, even more preferably, greater than or equal to 1.5 and less than or equal to 1.8.

In this way and as outlined above, it is advantageously possible to limit both the deformations (linked to the elastic modulus E') and hysteresis phenomena (linked to the tandelta parameter) of the radially inner layer of the tread band comprising the first vulcanized elastomeric material with an advantageous lower heat generation in extreme speed and maneuvering conditions of the tyre on a dry and/or hot ground.

In a particularly preferred embodiment, the tread band of the motorcycle tyre according to the invention extends according to a defined axial development and comprises:
  two lateral annular portions arranged on opposite sides with respect to the equatorial plane of the tyre in an area of the tread band arranged at a distance from the equatorial plane of at least 7% of an axial half-development of the tread band, said lateral annular portions extending transversally along 45-72%, of the axial half-development of the tread band;
  a first plurality of grooves formed in said lateral annular portions and extending at least in part according to a substantially longitudinal direction and alternatively arranged on opposite sides of the equatorial plane of the tyre;
  a second plurality of grooves in said lateral annular portions obliquely arranged with respect to the equatorial plane of the tyre.

Advantageously, the grooves of the tread band can define an overall void to rubber ratio of the tread band greater than or equal to 5% and less than or equal to 12%.

More preferably, the grooves of the tread band can define an overall void to rubber ratio of the tread band greater than or equal to 6% and less than or equal to 10% and, even more preferably equal to about 7.5%.

Preferably, the aforementioned first and second plurality of grooves define in the lateral annular portions of the tread band:
  a void to rubber ratio greater than or equal to 9% and less than or equal to 12%;
  a plurality of blocks obliquely arranged with respect to the equatorial plane of the tyre, the majority of the blocks defined between axially adjacent and/or circumferentially consecutive grooves having an increasing size towards an annular shoulder portion of the tyre if observed according to a direction opposite to a rolling direction of the tyre.

In a particularly preferred embodiment, all of the blocks defined in the lateral annular portions of the tread band between axially adjacent and/or circumferentially consecutive grooves have an increasing size towards an annular shoulder portion of the tyre if observed according to a direction opposite to a rolling direction of the tyre.

The Applicant has experimentally found that the control in the lateral annular portions of the tread band of the void to rubber ratio within the aforementioned range of values and the formation in the tread band of suitably shaped and sized grooves so as to define blocks that are obliquely arranged with respect to the equatorial plane of the tyre and having an increasing size towards an annular shoulder portion of the tyre, synergistically cooperate with the "cap-and-base" structure of the tread band defined above to achieve optimal features of drivability and performance of the tyre in extreme speed and maneuvering conditions in particular on dry and/or hot ground.

Without wishing to be bound to any interpretative theory, the Applicant deems that the particular configuration of the tread pattern according to this preferred embodiment allows in particular to reduce the mobility of the blocks in the areas of the tyre most stressed while driving along a bend in particular reducing the tyre degradation both on dry and/or hot ground.

Preferably, the aforementioned lateral annular portions are arranged on opposite sides with respect to the equatorial plane of the tyre in an area of the tread band arranged at a distance from the equatorial plane comprised between 7% and 15% of the axial half-development of the tread band.

In this way, it is advantageously possible to achieve optimal drivability and road holding characteristics on wet ground of the tyre thanks to the ability of the radially outer portion of the tread band to drain the water present under the ground-contacting area of the tyre in the areas of the tread band most used during these driving conditions.

Preferably, the aforementioned lateral annular portions transversally extend along 52-65% of the axial half-development of the tread band.

In this way, it is advantageously possible to achieve optimal drivability and road holding characteristics on wet ground of the tyre thanks to the ability of the radially outer portion of the tread band to adequately drain the water present under the ground-contacting area of the tyre in the areas of the tread band most used during these driving conditions.

Preferably, the aforementioned first and second plurality of grooves define a void to rubber ratio greater than or equal to 9.5% and less than or equal to 11.5% in the lateral annular portions of the tread band.

In this way, it is advantageously possible to achieve optimal drivability and road holding characteristics on wet ground of the tyre thanks to the ability of the radially outer portion of the tread band to drain the water present under the ground-contacting area of the tyre in the areas of the tread band most used during these driving conditions.

In a preferred embodiment, the radially inner portion of the tread band essentially consists of the aforementioned first vulcanized elastomeric material.

In a preferred embodiment, the radially outer portion of the tread band essentially consists of the aforementioned second vulcanized elastomeric material.

In a preferred embodiment, the radially inner and radially outer portions of the tread band extend in mutual superimposition substantially for the entire axial development of the tread band.

In a particularly preferred embodiment of the tyre according to the invention, the radially outer portion of the tread band comprises:
- a central sub-portion arranged astride the equatorial plane of the tyre, and
- a pair of lateral sub-portions, distal with respect to the equatorial plane of the tyre and arranged on opposite sides of said central sub-portion, said lateral sub-portions being made of the aforementioned second vulcanized elastomeric material.

More preferably, the central sub-portion arranged astride the equatorial plane is made of the aforementioned first vulcanized elastomeric material.

Within the framework of this preferred embodiment, the aforementioned central sub-portion of the radially outer portion of the tread band is advantageously integrally formed, for example formed by depositing contiguous circumferential coils of at least one continuous elongated element of elastomeric material or co-extruded, with the radially inner portion of the tread band using the aforementioned first vulcanized elastomeric material.

In this way, a pair of interfaces are defined—in the radially outer portion of the tread band and on opposite sides of the equatorial plane—between the first and the second vulcanized elastomeric material and that separate along the axial direction the central sub-portion from the lateral sub-portions of the radially outer portion of the tread band.

The Applicant has experimentally found that thanks to these features an optimal synergistic cooperation is achieved between the configuration of the tread pattern in the portions provided with grooves and the "cap-and-base" structure defined above of the tread band in achieving the aforementioned optimal drivability characteristics and tyre performance in extreme speed and maneuvering conditions in particular on dry and/or hot ground.

Preferably, the aforementioned lateral sub-portions of the radially outer portion of the tread band are arranged at a distance from the equatorial plane of the tyre, meant as the distance of the point(s) of the interface closest to the equatorial plane, comprised between 15% and 25% of the axial half-development of the tread band.

In a preferred embodiment, the aforementioned interfaces can converge towards the equatorial plane of the tyre from a radially inner to a radially outer portion of the tread band.

In this case, the aforementioned interfaces are inclined with respect to the equatorial plane of an angle preferably comprised between 30° and 50°.

In this way, it is advantageously possible to achieve a gradual transition along the axial direction between the first and the second vulcanized elastomeric material in the tread band obtaining optimal mechanical and structural integrity characteristics.

In alternative preferred embodiments, the aforementioned interfaces can be parallel to the equatorial plane of the tyre or, furthermore, diverge moving away from the equatorial plane from a radially inner to a radially outer portion of the tread band.

In this case, the aforementioned interfaces are inclined with respect to the equatorial plane of the tyre at an angle preferably comprised between 120° and 140°.

In a preferred embodiment, each of the lateral annular portions of the tread band comprises a first annular sub-portion axially proximal to the equatorial plane of the tyre and a second annular sub-portion axially distal with respect to the equatorial plane of the tyre.

Preferably, the aforementioned first and second plurality of grooves define, in the second annular sub-portions of the tread band, a void to rubber ratio decreasing along the axial half-development of the tread band from the first annular sub-portion towards the corresponding annular shoulder portion of the tread band.

The Applicant has experimentally found that thanks to these features a significant synergistic cooperation occurs between the configuration of the tread pattern in the portions provided with grooves and the "cap-and-base" structure defined above of the tread band in achieving optimal drivability characteristics and tyre performance both on dry and/or hot ground, and on wet and/or cold ground.

In a preferred embodiment, the first annular sub-portion of the tread band transversally extends along 15-30%, more preferably along 20-25%, of the axial half-development of the tread band.

Preferably, the first annular sub-portion of the tread band has a void to rubber ratio greater than or equal to 9% and less than or equal to 16%, more preferably greater than or equal to 11% and less than or equal to 14%.

The Applicant has experimentally found that thanks to these features it is possible to carry out an effective water drainage under the ground-contacting area of the tyre in driving conditions on wet ground.

In a preferred embodiment, the second annular sub-portion of the tread band transversally extends along 30-42%, more preferably along 32-40%, of the axial half-development of the tread band.

Preferably, the second annular sub-portion of the tread band has a void to rubber ratio greater than or equal to 3% and less than or equal to 8%, more preferably greater than or equal to 4% and less than or equal to 7%.

The Applicant has experimentally found that thanks to these features a significant synergistic cooperation occurs between the configuration of the tread pattern in the portions provided with grooves but with low void to rubber ratio and the "cap-and-base" structure defined above of the tread band in achieving the aforementioned optimal drivability characteristics and tyre performance in extreme speed and maneuvering conditions in particular on dry and/or hot ground.

Preferably, the aforementioned first plurality of grooves extending at least in part according to a substantially longitudinal direction comprises a circumferential sequence of first pairs of grooves having a slightly arched course so as to form a concavity facing towards the equatorial plane of the tyre or, alternatively, a substantially rectilinear course (in other words oriented along a substantially circumferential direction).

In this way, it is advantageously possible to achieve an effective drainage of the water present under the ground-contacting area of the tyre while driving along a bend at low camber angles when the tyre comes out from the trajectory of the front tyre.

Preferably, the first pairs of grooves are arranged on opposite sides of the equatorial plane of the tyre and are longitudinally offset from one another.

In this way, it is advantageously possible to make the overall rigidity of the tread band uniform in particular when travelling along a straight path at high speed.

Preferably, the first pairs of grooves are tapered along a preferential rolling direction of said tyre.

Preferably, the aforementioned first plurality of grooves extending at least in part according to a substantially longitudinal direction comprises a circumferential sequence of second pairs of grooves having a substantially curvilinear course.

Preferably, the grooves of the second pairs of grooves and having a substantially curvilinear course form a concavity facing towards an opposite direction with respect to the equatorial plane of the tyre (in other words towards the shoulder portions of the tread band) and consistent with a preferential rolling direction of the tyre.

In this way, it is advantageously possible to achieve an optimal wear regularity of the tyre.

Preferably, the grooves of the second pairs of grooves are arranged on opposite sides of the equatorial plane of the tyre and are longitudinally offset from one another.

Preferably, the grooves of the second pairs of grooves are tapered from the equatorial plane towards the shoulder portion of the tyre.

More preferably, the grooves of the second pairs of grooves are tapered along a direction opposite to the preferential rolling direction of said tyre.

In this way, it is advantageously possible to achieve the desired size increase of the blocks towards the annular shoulder portion of the tyre according to a course that follows the so-called wear waves of the tread band.

Preferably, the grooves of the second pairs of grooves having a substantially curvilinear course are arranged at an average angle not less than about 25° with respect to the equatorial plane of the tyre.

Even more preferably, the grooves of the second pairs of grooves having a substantially curvilinear course are arranged at an average angle comprised between 30° and 40° with respect to the equatorial plane of the tyre.

In this way, it is advantageously possible to optimize the wear regularity of the tyre since the aforementioned average angle best responds to the direction of the contact forces transmitted to the tread band during use.

Preferably, the aforementioned second plurality of grooves formed in said lateral annular portions and obliquely arranged with respect to the equatorial plane of the tyre comprises a circumferential sequence of grooves groups circumferentially distanced from one another.

Preferably, each group of grooves comprises at least two grooves having a substantially curvilinear course so as to form a concavity facing towards the equatorial plane of the tyre and along a direction opposite to the preferential rolling direction of the tyre.

Preferably, one or more of the grooves of the aforementioned second plurality of grooves obliquely arranged with respect to the equatorial plane of the tyre are tapered from the equatorial plane towards the shoulder portion of the tyre.

In this way, it is advantageously possible to achieve the desired size increase of the blocks towards the annular shoulder portion of the tyre according to a course that follows the so-called wear waves of the tread band.

In this preferred embodiment, moreover, the grooves of the second pairs of grooves having a substantially curvilinear course and extending at least in part according to a substantially longitudinal direction and the grooves of the aforementioned second plurality of grooves obliquely arranged with respect to the equatorial plane of the tyre and having a substantially curvilinear course, have a concavity opposite to each other in relation to the preferential rolling direction of the tyre.

Preferably, the grooves of the aforementioned second plurality of grooves obliquely arranged with respect to the equatorial plane of the tyre are arranged at an average angle not less than about 30° with respect to the equatorial plane of the tyre.

Even more preferably, the grooves of the aforementioned second plurality of grooves obliquely arranged with respect to the equatorial plane of the tyre are arranged at an average angle comprised between 35° and 45° with respect to the equatorial plane of the tyre.

In this way, it is advantageously possible to optimize the wear regularity of the tyre since the average angle of the second plurality of grooves best responds to the direction of the contact forces transmitted to the tread band during use.

In a preferred embodiment, the central annular portion of the tread band transversally extends along 7-15% of the axial development of the tread band. This is equivalent to the fact that each central annular half-portion of the tread band transversally extends along 7-15% of the axial half-development of the tread band.

More preferably, the central annular portion of the tread band extends transversally along 8-12% of the axial development of the tread band.

In this way, it is advantageously possible to optimize the mileage and the wear regularity of the tyre without jeopardizing either the handling and road holding characteristics of the tyre in wet and/or cold climate conditions or on a non-optimal ground surface, or the drivability characteristics and performance of the tyre in conditions of extreme speed and maneuvering on dry and/or hot ground.

Preferably, the central annular portion of the tread band arranged astride the equatorial plane is substantially free of grooves.

Maintaining a portion substantially free of grooves at the equatorial plane allows to form a closed loop of tread band having very high rigidity in this portion, so that while travelling along a straight path at high speed it is possible to effectively discharge to the ground the drive torque in acceleration and/or the braking torque in deceleration, while at the same time maintaining an excellent stability of the motorcycle.

Such a choice is therefore very advantageous both for use on a front tyre and on a rear tyre.

Preferably, the annular shoulder portion of the tread band is substantially free of grooves so as to optimize the grip of the tyre to the road surface when the motorcycle travels along a bend with higher camber angles.

Preferably, the tyre is a tyre for motorcycle rear wheels and has a transversal curvature ratio of at least about 0.30 and, preferably comprised between 0.30 and 0.35.

BRIEF DESCRIPTION OF THE FIGURES

Additional features and advantages of the invention will be better apparent from the following description of some preferred embodiments thereof, made hereinafter, for illustrative and not limiting purposes, with reference to the attached drawings.

Such drawings are schematic and not to scale.

In the drawings:

FIG. 1 shows a perspective view of a tyre according to a preferred embodiment of the invention intended to be mounted on the rear wheel of a motorcycle;

FIG. 2 is an enlarged view of a cross section of the tyre of FIG. 1;

FIG. 3 is a schematic plan view of a portion of the tread band of the tyre of FIG. 1.

DETAILED DESCRIPTION OF THE CURRENTLY PREFERRED EMBODIMENTS

Figure 1:
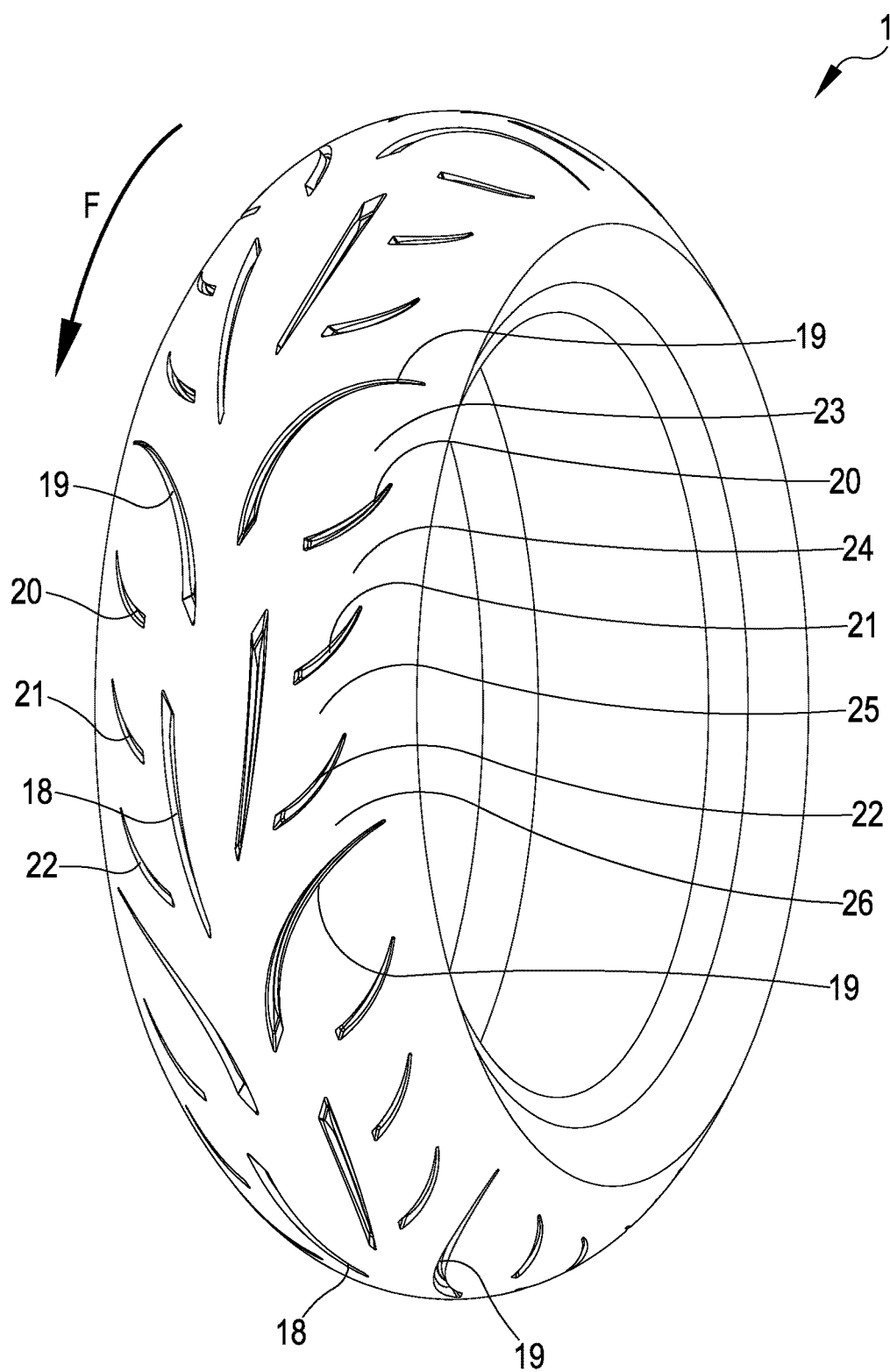

In the figures, reference numeral 1 generally indicates a tyre for motorcycle wheels according to a preferred embodiment of the present invention. This tyre is preferably intended to be used on a rear wheel of a Supersport motorcycle having large displacement, for example 600 cc.

In the tyre 1 an equatorial plane X-X and a rotation axis (not shown) are defined. Moreover, a circumferential direction (indicated in FIGS. 1 and 3 with the arrow F oriented along the rotation direction of the tyre 1) and an axial direction, indicated in FIG. 2 with the axis r perpendicular to the equatorial plane X-X, are defined.

The tyre 1 comprises a carcass structure 2 comprising at least one carcass layer 2a, made of an elastomeric material and comprising a plurality of reinforcing elements arranged parallel to one another.

The at least one carcass layer engages, by means of opposite circumferential edges thereof, also superimposed, at least one annular reinforcing structure 9.

In particular, the opposite lateral edges of the at least one carcass layer 2a are turned up about annular reinforcing structures, called bead cores 4.

A tapered elastomeric filling 5 taking up the space defined between the carcass layer 2a and the respective turned-up lateral edge 2b of the carcass layer 2a is applied on the axially outer perimetral edge of the bead cores 4.

As known, the tyre region comprising the bead core 4 and the filling 5 forms the so-called bead, intended for anchoring the tyre to a respective fitting rim, not shown.

Figure 2:
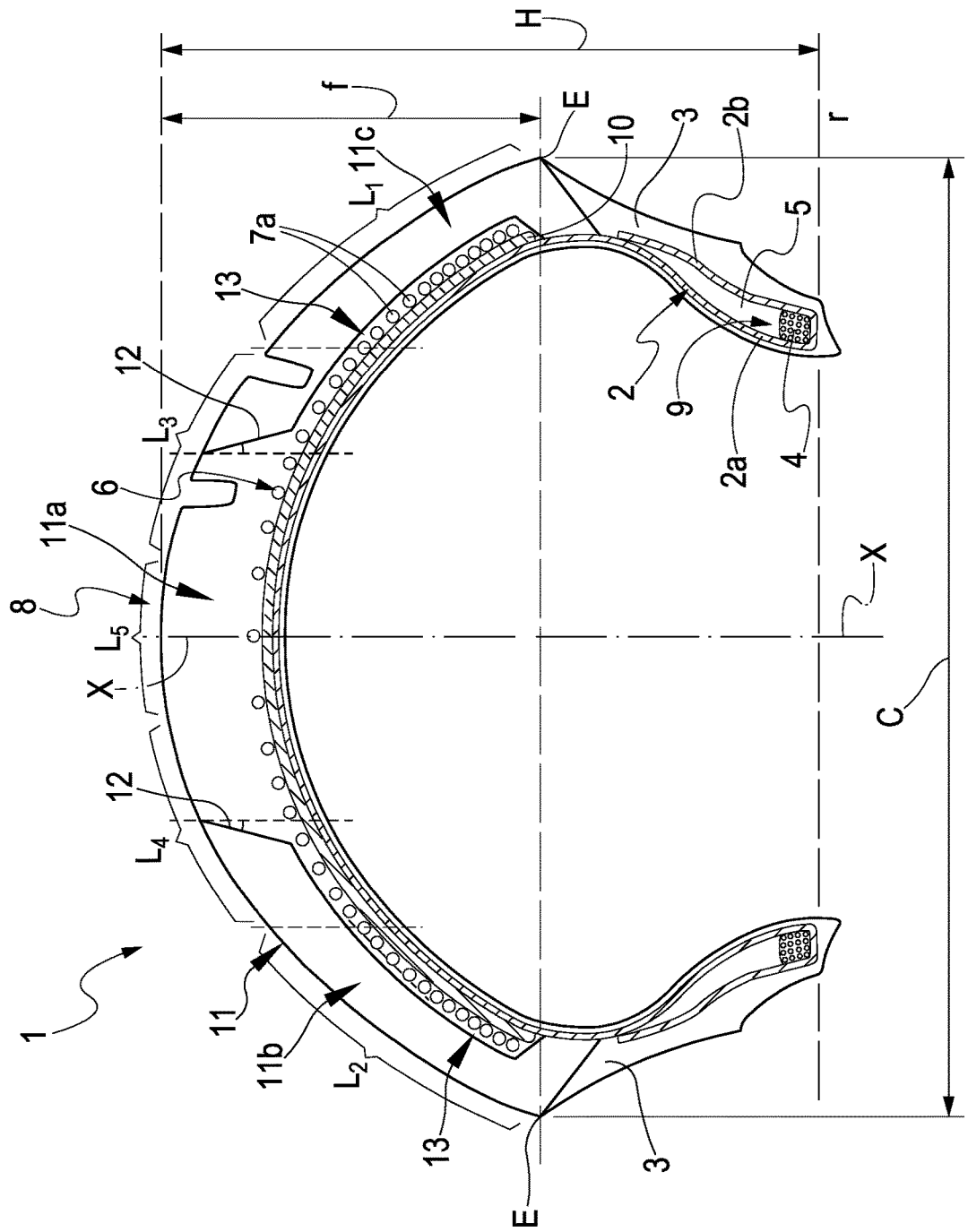

Still referring to the embodiment shown in FIG. 2, the reinforcing elements included in the carcass layer 2a preferably comprise textile cords, selected from those usually adopted in the manufacture of carcasses for tyres, for example Nylon, Rayon, PET, PEN, Lyocell cords, with an elementary filament having a diameter of between 0.35 mm and 1.5 mm, or steel metal cords with an elementary filament having a diameter of between 0.10 mm and 0.5 mm.

Preferably, the textile materials for manufacturing the carcass structure are Rayon and/or Lyocell.

In an embodiment not shown, the carcass structure has its opposite lateral edges associated without a turn-up with special annular reinforcing structures provided with two annular inserts. A filling of elastomeric material may be located at an axially outer position with respect to the first annular insert. The second annular insert is instead located at an axially outer position with respect to the end of the carcass ply.

Finally, at an axially outer position with respect to said second annular insert, and not necessarily in contact with the same, a further filling may be provided which terminates the formation of the annular reinforcing structure.

A belt structure 6 is circumferentially applied on the carcass structure 2, at a radially outer position.

At a radially outer position with respect to the belt structure 6 a tread band 8 is provided by means of which the contact of the tyre 1 with the ground takes place.

Longitudinal and/or transversal grooves, which will be described in greater detail hereinafter, arranged so as to define a desired tread pattern, are typically formed on the tread band 8 subsequent to a molding operation carried out at the same time as the vulcanization of the tyre 1.

The tyre 1 may comprise a pair of sidewalls 3 laterally applied on opposite sides to said carcass structure 2.

The tyre 1 has a section height H measured, at the equatorial plane X-X, between the top of the tread band 8 and the fitting diameter, identified by a reference line r, passing through the beads of the tyre 1.

The tyre 1 further has a cross section maximum width C defined by the distance between the axially opposite ends E of the profile of the tread band 8, and a curvature ratio, defined as the ratio between the distance f of the top of the tread band 8 from the line passing through the ends E of the tread band 8 itself, measured at the equatorial plane of the tyre 1 and the aforesaid maximum width C. The axially opposite ends E of the tread band 8 may be formed by a corner.

In particular, the tyre 1 has a cross section characterized by a high curvature ratio, preferably a curvature ratio f/C at least equal to about 0.30.

In a preferred embodiment, the motorcycle tyre 1 of the invention is intended to be fitted to a rear wheel having chord dimensions substantially comprised between 160 and 210 mm.

Preferably, the distance f of the radially outer point of the tread band 8 from the line passing through the axially opposite ends E of the tread band 8 itself of the tyre 1 is substantially comprised between 50 and 70 mm.

Preferably, for a tyre 1 intended to be mounted on the rear wheel of a motorcycle the transversal curvature ratio f/C is substantially equal to or greater than 0.30, even more preferably comprised between 0.30 and 0.35.

Preferably, the total height/chord H/C ratio is substantially comprised between 0.5 and 0.65.

In preferred embodiments, the tyres 1 allow better performance when they have sidewalls 3 having a substantial height, for example, with values of the sidewall height (H-f)/H ratio equal to or greater than 0.35, more preferably equal to or greater than 0.4 when the tyre 1 is intended to be mounted on the rear wheel of a motorcycle.

Preferably, the tyre 1 has a ratio between shoulder radius and maximum cross section width equal to or greater than 0.60.

The carcass structure 2 is typically coated on the inner walls thereof by a sealing layer, or so-called "liner", not better shown in the figures, essentially consisting of a layer of an airtight elastomeric material, adapted to ensure an airtight seal of the tyre 1 once inflated.

Preferably, the belt structure 6 consists of a layer that has a plurality of circumferential windings 7a, axially arranged in side-by-side relationship, formed by a rubberized cord or by a strip comprising a number (preferably from two to five) of rubberized cords, spirally wound at an angle substantially equal to zero (typically between 0° and 5°) with respect to the equatorial plane X-X of the tyre 1.

Preferably, the belt structure 6 extends substantially over the entire crown portion of the tyre 1.

In a preferred embodiment, the belt structure 6 can consist of at least two radially superimposed layers, each consisting of elastomeric material reinforced with cords arranged parallel to one another. The layers are arranged so that the cords of the first belt layer 6 are oriented obliquely with respect to the equatorial plane X-X of the tyre 1, whereas the cords of the second layer also have an oblique, but symmetrically crossed, orientation with respect to the cords of the first layer (the so-called "cross-belt").

In both cases, generally, the cords of the belt structure 6 are textile or metallic cords.

Preferably, the tyre 1 can comprise a layer 10 of elastomeric material arranged between the carcass structure 2 and the belt structure 6, the layer 10 preferably extending over a surface substantially corresponding to the development surface of the belt structure 6.

According to the invention, the tread band 8 is of the so-called "cap-and-base" type and is made of at least two different elastomeric materials.

In the preferred embodiment illustrated in the figures, the tread band 8 comprises a radially inner portion 13 comprising a first vulcanized elastomeric material and a radially outer portion 11 comprising a second vulcanized elastomeric material.

The rubber compounds for the different portions of the tread band 8 as well as for the other semi-finished products forming the tyre 1 comprise at least one elastomeric diene polymer (a1).

Advantageously, such rubber compounds comprise at least one alpha-olefin.

According to one embodiment, said at least one elastomeric diene polymer (a1) can for example be selected from elastomeric diene polymers commonly used in the elastomeric compositions cross-linkable with sulfur (curing), which are particularly suitable for tyre production, i.e. from elastomeric polymers or copolymers with an unsaturated chain having a glass transition temperature (Tg) normally below 20° C., preferably in the range of 0° C. to −110° C. These polymers or copolymers can be of natural origin or they can be obtained by means of polymerisation in solution, polymerisation in emulsion or polymerisation in gaseous phase of one or more conjugated diolefins, optionally mixed with at least one comonomer selected from monovinylarenes and/or polar comonomers.

For the tread compound, polybutadiene (BR) and/or styrene-butadiene (SBR) polymers, for example SSBR (styrene butadiene elastomer from solution) can preferably be used, separately or mixed.

Alternatively, mixtures can be used comprising polyisoprene (natural or synthetic) and a styrene-butadiene (SBR) polymer.

Preferably, the styrene-butadiene polymer (SBR) can be present in the rubber compounds of the present invention in variable amounts from about 1 to 100 phr, more preferably from 5 to 95 phr.

Advantageously, the polybutadiene (BR) can be absent or be included in the rubber compounds of the present invention and in particular in the tread rubber compound in an amount from about 1 phr to 100 phr, preferably from about 1 phr to 80 phr, more preferably from about 5 to 50 phr.

Preferably, the styrene-butadiene polymer can come from solution or emulsion, and comprises styrene in a quantity generally ranging from about 10 to 40%, preferably from about 15 to 30%.

Preferably the styrene-butadiene polymer can have a low molecular weight, having an average molecular weight Mn lower than 50000 g/mol, preferably comprised between 1000 and 50000 g/mol.

The elastomeric material of the different portions of the tread band 8 comprises at least one reinforcing filler present in an amount generally comprised between 1 phr and 130 phr.

Such a reinforcing filler is preferably selected among the so-called white fillers: silica, alumina, silicates, hydrotalcite, calcium carbonate, kaolin, titanium dioxide and mixtures thereof.

The reinforcing filler used in the elastomeric material of the different portions of the tread band 8 can also comprise carbon black.

Preferably, the first elastomeric material of the radially inner portion of the tread band 8 comprises a reinforcing filler mainly comprising or substantially consisting of a white filler, Preferably, the first vulcanized elastomeric material is obtained by vulcanizing an elastomeric material comprising 100 phr of at least one elastomeric diene polymer and from 30 to 130 phr of at least one reinforcing filler comprising an amount greater than 75%, preferably equal to or greater than 80%, more preferably equal to or greater than 85%, more preferably equal to or greater than 90%, more preferably equal to or greater than 95% by weight of the total weight of the reinforcing fillers, of an inorganic material selected from silica, alumina, silicates, hydrotalcite, calcium carbonate, kaolin, titanium dioxide and mixtures thereof.

Preferably, the second vulcanized elastomeric material is obtained by vulcanizing an elastomeric material comprising 100 phr of at least one elastomeric diene polymer, from 30 to 130 phr of at least one reinforcing filler comprising an amount equal to or greater than 80% more preferably equal to or greater than 85%, more preferably equal to or greater than 90%, more preferably equal to or greater than 95% by weight of the total weight of the reinforcing fillers, of an inorganic material selected from silica, alumina, silicates, hydrotalcite, calcium carbonate, kaolin, titanium dioxide and mixtures thereof.

Preferably, the aforementioned white filler is silica.

Preferably, the silica that can be used in the present invention can generally be a pyrogenic silica or, preferably, a precipitated silica, with a BET surface area (measured according to Standard ISO 5794/1) comprised between 50 $m^2/g$ and 500 $m^2/g$, preferably between 70 $m^2/g$ and 200 $m^2/g$.

The elastomeric compositions described above and those of the other components of the tyre 1 can be vulcanized according to known techniques, in particular with sulfur-based vulcanization systems, commonly used for elastomeric polymers. To this end, in the elastomeric composition, after one or more thermomechanical treatment steps, a sulfur-based vulcanizing agent is incorporated together with vulcanization accelerants. In the final step of the treatment, the temperature is generally kept below 140° C., so as to avoid any undesired pre-cross-linking phenomena.

The vulcanizing agent most advantageously used is sulfur, or molecules containing sulfur (sulfur donors), with accelerants and activators known by those skilled in the art.

The activators that are particularly effective are zinc-based compounds, and in particular $ZnO$, $ZnCO_3$, zinc salts of saturated or unsaturated fatty acids containing from 8 to 18 carbon atoms, such as, for example, zinc stearate, which are preferably formed in situ in the elastomeric composition from ZnO and fatty acid, and also $BiO$, $PbO$, $Pb_3O_4$, $PbO_2$, or mixtures thereof.

The accelerants that are commonly used can be selected among: dithiocarbamates, guanidine, thiourea, thiazoles, sulfonamides, thiurams, amines, xanthates, or mixtures thereof.

The elastomeric compositions used can comprise other additives commonly selected based on the specific application for which each composition is intended.

For example, the following additives can be added to said elastomeric compositions: antioxidants, anti-ageing agents, plasticizers, adhesives, anti-ozonants, modifying resins, fibers (aramidic or of natural origin), or mixtures thereof.

The following Table 1 gives for purely indicative purposes an example of the compounds that constitute after vulcanization the first and the second vulcanized elastomeric material in a preferred embodiment of the tyre 1.

The expression "rubber", "elastomeric polymer" or "elastomer" is meant to indicate a natural or synthetic polymer that, after vulcanization, can be repeatedly stretched at room temperature to at least double its original length and that after removal of the traction load returns immediately and with force to its approximately original length (definition according to ASTM, committee E8, Philadelphia 19).

The amounts of the various components of an elastomeric composition are generally provided in phr as defined above.

TABLE 1

|  | First elastomeric material (radially inner portion of the tread band or "base") | Second elastomeric material (radially outer portion of the tread band or "cap") |
| --- | --- | --- |
| SSBR | 100 | 114 |
| BR | 27.3 | 17 |
| CB | 10 | 10 |
| Silica | 90 | 90 |
| Plasticizer | 18.5 | 18.5 |
| Resin | 18 | 30.0 |
| Wax | 1.0 | 1.0 |
| Antiozonant | 3.0 | 3.0 |
| Stearic acid | 2.0 | 2.0 |
| Zinc oxide | 3.0 | 3.0 |
| Silane | 7.2 | 7.2 |
| Accelerant | 3.0 | 3.0 |
| DPG | 2 | 2 |
| Soluble sulfur | 1.3 | 1.3 |

SSBR: styrene-butadiene copolymer from solution (phr given as dry polymer, extended with 37.5 phr of TDAE oil every 100 phr of dry elastomeric polymer (NS522 Zeon)
BR: Butadiene Rubber BR60 (Synthos)
CB: Carbon black N234 (Cabot)
Silica: Ultrasil ® 7000 (Evonik)
Plasticizer and Extension oil: TDAE (Nyas)
Resin: Kristalex ™ F85 (Eastman Chemical Company)
Wax: Mixture of N-paraffin (Repsol)
Anti-ozonant: 6PPD (N-(1,3-dimethylbutyl)-N'-phenyl-p-phenylendiamine) (Eastman)
Stearic acid: (Undesa)
Zinc oxide: ZnO Rhein Chemie.
Silane: Si 69 (Evonik)
Accelerant: (N-cyclohexylbenzothiazole-2-sulfenamide) Vulkacit ® CZ/C (Lanxess)
DPG: Diphenylguanidine (Perkacit ® DPG Eastman Chemical Company)
Soluble sulfur: (Zolfo Industria)

According to the invention, the first vulcanized elastomeric material used in the radially inner portion 13 of the tread band 8 has a ratio R1 between the dynamic elastic modulus (E') and the tandelta measured at a frequency of 10 Hz and at 70° C. comprised between 27 and 35.

In a preferred embodiment, the aforementioned ratio R1 is comprised between 27.5 and 32.5.

Preferably, the ratio R1/R2 is comprised between 1.1 and 2.0.

In this way and as outlined above, it is advantageously possible to impart to the radially inner portion 13 of the tread band 8 the those characteristics of rigidity and, at the same time, of hysteresis, controlled so as to achieve the desired performance improvement of the tyre 1 on wet or cold ground while maintaining or even improving at the same time the performance on dry or hot ground.

According to the invention, the second vulcanized elastomeric material used in the radially outer portion 11 of the tread band 8 has a ratio R2 between the dynamic elastic modulus (E') and the tandelta measured at a frequency of 10 Hz and at 70° C. of the second vulcanized elastomeric material is comprised between 15 and 30.

In a preferred embodiment, the aforementioned ratio R2 is comprised between 15 and 20.

In this way and as outlined above, it is advantageously possible to impart to the radially outer portion 11 of the tread band 8 the desired grip characteristics of the tyre 1 both on wet or cold ground, and on dry or hot ground.

Figure 3:
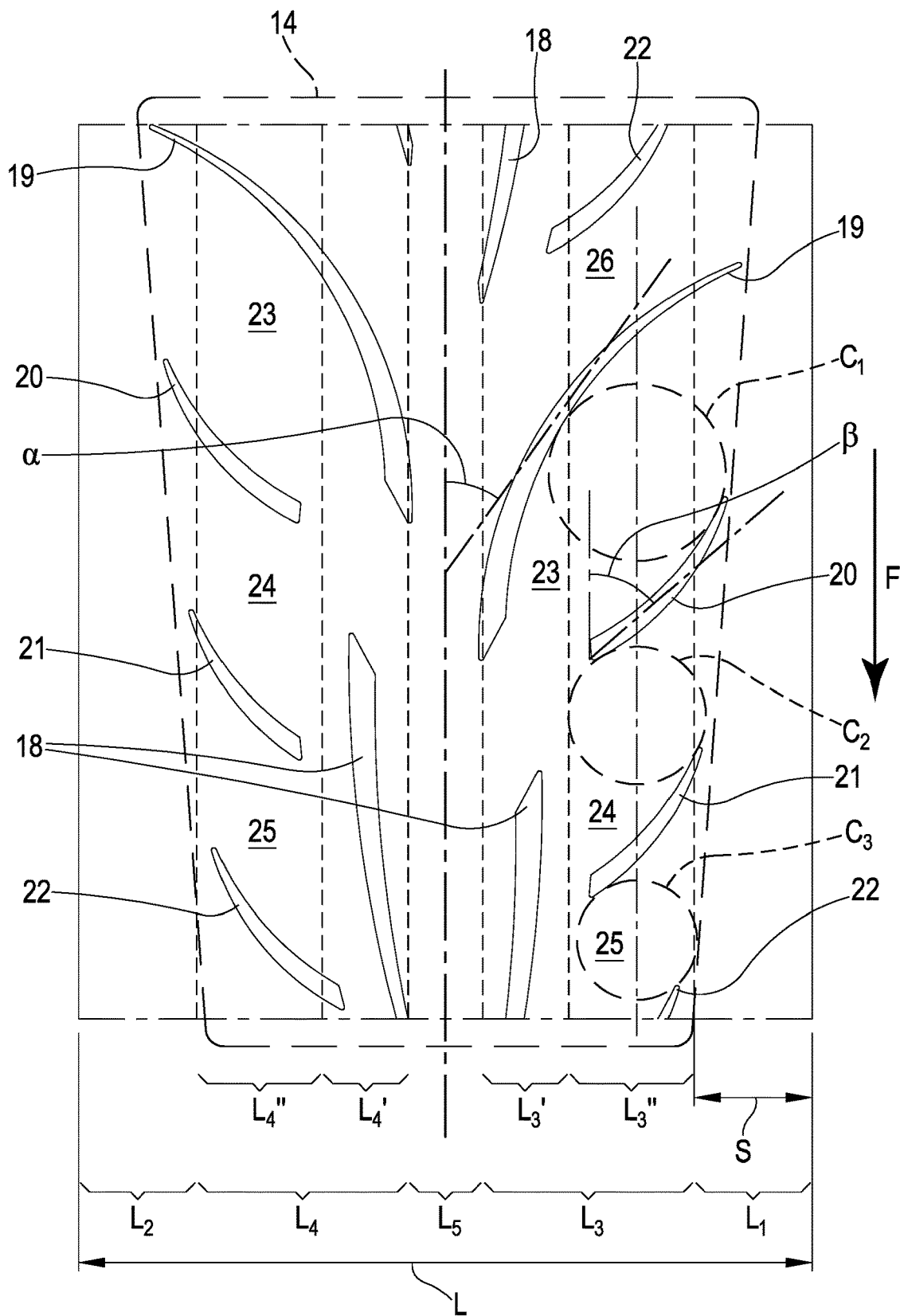

FIGS. 1-3 show as an example a tread pattern that satisfies the requirements of void to rubber ratio profile and of grooves distribution profile according to particularly preferred embodiments of the present invention.

The tread pattern comprises a module 14 repeated along a circumferential development direction of the tyre 1.

The module 14, in the case of a tyre 1 intended to be mounted on the rear wheel of a motorcycle, such as the tyre shown in FIGS. 1-3, is repeated at least six times along the circumferential development of the tyre. Preferably, at least seven times, for example eight times.

In the preferred embodiment illustrated in the figures, the tread band 8 of the tyre 1 extends according to an axial development L and comprises two lateral annular portions L3, L4 arranged on opposite sides with respect to the equatorial plane X-X of the tyre 1 in an area of the tread band 8 the start of which is arranged at a distance from the equatorial plane equal to about 9% of the axial half-development L/2 of the tread band 8.

Preferably, the lateral annular portions L3, L4 transversally extend along about 58% of the axial half-development L/2 of the tread band 8.

Preferably, in the lateral annular portions L3, L4 of the tread band 8 a first plurality of grooves is formed extending at least in part according to a substantially longitudinal direction and alternatively arranged on opposite sides of the equatorial plane X-X of the tyre 1.

Preferably, the aforementioned first plurality of grooves comprises a circumferential sequence of first pairs of grooves 18 having a slightly arched course so as to form a concavity facing towards the equatorial plane X-X of the tyre 1.

In an alternative preferred embodiment, not illustrated, the first pairs of grooves 18 have a substantially rectilinear course (in other words, oriented along a substantially circumferential direction).

Preferably, the first pairs of grooves 18 are arranged on opposite sides of the equatorial plane X-X of the tyre 1 and are longitudinally offset from one another.

Preferably, the first pairs of grooves 18 are tapered along the preferential rolling direction F of the tyre 1.

Preferably, the aforementioned first plurality of grooves comprises a circumferential sequence of second pairs of grooves 19 having a substantially curvilinear course so as to form a concavity facing towards an opposite direction with respect to the equatorial plane X-X of the tyre 1 (in other words, towards the shoulder portions L1, L2 of the tread band 8) and consistent with a preferential rolling direction F of the tyre 1 (see FIG. 3).

Preferably, the second pairs of grooves 19 of the first plurality of grooves are arranged on opposite sides of the equatorial plane X-X of the tyre 1 and are longitudinally offset from one another.

Preferably, the second pairs of grooves 19 of the first plurality of grooves are tapered from the equatorial plane X-X towards the shoulder portion L1, L2 of the tyre 1 and along a direction opposite to the preferential rolling direction F of the tyre itself.

Preferably, the grooves 19 of the second pairs of grooves of the first plurality of grooves are arranged at an average angle α comprised between 30° and 40°, for example equal to about 35°, with respect to the equatorial plane X-X of the tyre 1 (see FIG. 3).

Preferably, in the lateral annular portions L3, L4 of the tread band 8 a second plurality of grooves is formed obliquely arranged with respect to the equatorial plane X-X of the tyre 1.

Preferably, the aforementioned second plurality of grooves formed in said lateral annular portions L3, L4 of the tread band 8 and obliquely arranged with respect to the equatorial plane X-X of the tyre 1 comprises a circumferential sequence of groups of grooves, for example three grooves 20, 21 and 22 circumferentially spaced apart from each other.

Preferably, the grooves 20-22 of each group of grooves of the second plurality of grooves have a substantially curvilinear course so as to form a concavity facing towards the equatorial plane X-X of the tyre 1 and along a direction opposite to the preferential rolling direction F of the tyre itself.

Preferably, the grooves 20-22 of each group of grooves of the aforementioned second plurality of grooves are tapered from the equatorial plane X-X towards the shoulder portion L1, L2 of the tyre 1.

In the preferred embodiment illustrated in the figures, the grooves 19 of the first plurality of grooves and the grooves 20-22 of the second plurality of grooves have mutually opposite concavities with respect to the preferential rolling direction F of the tyre 1.

Preferably, the grooves 20-22 of each group of grooves of the second plurality of grooves are arranged at an average angle $\beta$ comprised between 35° and 45°, for example equal to about 40°, with respect to the equatorial plane X-X of the tyre 1 (see FIG. 3).

Preferably, the aforementioned first and second plurality of grooves 18; 19; 20-22 formed in the lateral annular portions L3, L4 of the tread band 8 define, in such lateral annular portions L3, L4, a void to rubber ratio greater than or equal to 9% and less than or equal to 12%.

In order to measure the void to rubber ratio at one of the annular portions L3, L4 of the tread band 8, an annular sector of width equal to 10 mm can for example be considered and, then, the void to rubber ratio of the annular portion L3, L4 considered can be calculated.

Preferably, the aforementioned first and second plurality of grooves 18; 19; 20-22 formed in the lateral annular portions L3, L4 of the tread band 8 define, in such lateral annular portions L3, L4, a plurality of blocks 23-26 obliquely arranged with respect to the equatorial plane X-X of the tyre 1.

Preferably, the majority of the blocks 23-26 and, more preferably, all of the blocks 23-26 defined between axially adjacent and/or circumferentially consecutive grooves have an increasing size towards an annular shoulder portion L1, L2 of the tyre 1 if observed according to a direction opposite to the rolling direction F of the tyre itself.

As outlined above, the size of the blocks 23-26 can for example be defined by the diameter of a circle tangent to the facing edges of axially adjacent and/or circumferentially consecutive grooves, for example between the grooves 19 and 20, 20 and 21, 21 and 22, and inscribed between said grooves.

Some of these circles, indicated with reference symbols $C_1$, $C_2$ and $C_3$ are illustrated merely as an example in FIG. 3.

Preferably, the lateral annular portions L3, L4 are arranged on opposite sides with respect to the equatorial plane X-X of the tyre 1 in an area of the tread band 8 arranged at a distance from the equatorial plane X-X comprised between 7% and 15% of the axial half-development L/2 of the tread band.

Preferably, the lateral annular portions L3, L4 transversally extend along 45-72%, more preferably along 52-65%, of the axial half-development L/2 of the tread band 8.

In the preferred embodiment illustrated in the figures, the tread band 8 of the tyre 1 comprises a central annular portion L5 arranged astride the equatorial plane X-X.

Preferably, the central annular portion L5 has a void to rubber ratio substantially equal to zero (i.e. equal to zero or less than 0.2%).

In the preferred embodiment illustrated in the figures, each of the lateral annular portions L3, L4 of the tread band 8 comprises a first annular sub-portion L3', L4' axially proximal to the equatorial plane X-X of the tyre 1 and a second annular sub-portion L3", L4" axially distal with respect to the equatorial plane X-X.

Preferably, the aforementioned first and second plurality of grooves 18, 19; 20-22 define, in the second annular sub-portions L3", L4" of the tread band 8, a void to rubber ratio decreasing along the axial development of the tread band 8 from the first annular sub-portion L3', L4' towards the corresponding annular shoulder portion L1, L2 of the tread band 8.

Preferably, the first annular sub-portion L3', L4' of the tread band 8 transversally extends along 15-30%, more preferably along 20-25%, of the axial half-development L/2 of the tread band itself.

Preferably, the first annular sub-portion L3', L4' of the tread band 8 has a void to rubber ratio greater than or equal to 9% and less than or equal to 16%, more preferably greater than or equal to 11% and less than or equal to 14%.

Preferably, the second annular sub-portion L3", L4" of the tread band 8 transversally extends along 30-42%, more preferably along 32-40%, of the axial half-development L/2 of the tread band itself.

Preferably, the second annular sub-portion L3", L4" of the tread band 8 has a void to rubber ratio greater than or equal to 3% and less than or equal to 8%, more preferably greater than or equal to 4% and less than or equal to 7%.

Preferably, the central annular portion L5 of the tread band 8 transversally extends along 7-15%, more preferably along 8-12%, of the axial development L of the tread band 8.

In the preferred embodiment illustrated in the figures, the radially outer portion 11 of the tread band 8 comprises a central sub-portion 11a arranged astride the equatorial plane X-X and preferably made of the aforementioned first vulcanized elastomeric material.

In this preferred embodiment, the radially outer portion 11 of the tread band 8 also comprises a pair of lateral sub-portions 11b, 11c, distal with respect to the equatorial plane X-X and arranged on opposite sides of the central sub-portion 11a.

Preferably, the lateral sub-portions 11b, 11c are made of the second vulcanized elastomeric material.

As can be seen from FIG. 2, in this preferred embodiment, the central sub-portion 11a of the radially outer portion 11 of the tread band 8 is advantageously integrally formed, for example formed by depositing contiguous circumferential coils of at least one continuous elongated element made of elastomeric material or co-extruded, with the radially inner portion 13 of the tread band 8 in the aforementioned first vulcanized elastomeric material.

In this way and as outlined above, a pair of interfaces 12 between the first and the second vulcanized elastomeric material are defined in the radially outer portion 11 of the tread band 8 and on opposite sides of the equatorial plane X-X of the tyre 1 and of the central annular portion L5.

In this preferred configuration of the tread band 8, the interfaces 12 thus separate along the axial direction the central sub-portion 11a from the lateral sub-portions 11b, 11c of the radially outer portion 11 of the tread band 8.

Preferably, the lateral sub-portions 11b, 11c of the radially outer portion 11 of the tread band 8 and, therefore the interfaces 12, are arranged at a distance from the equatorial plane X-X of the tyre 1, as defined above, equal to about 20% of the axial half-development L/2 of the tread band 8.

In the preferred embodiment shown in FIG. 2, the interfaces 12 can converge towards the equatorial plane X-X of the tyre 1 from a radially inner to a radially outer portion of the tread band 8 being oriented according to a direction inclined with respect to the equatorial plane X-X at an angle comprised between 30° and 40°, for example preferably equal to about 35°.

In this preferred configuration of the tread band 8, the radially inner portion 13 of the tread band 8 extends, at a radially outer position, substantially along the entire axial development of the belt layer 6.

In this preferred configuration of the tread band 8, therefore, the radially inner portion 13 of the tread band 8 is interposed along the radial direction between the belt structure 6, a part of the lateral annular portions L3, L4 and the lateral sub-portions 11b, 11c of the radially outer portion 11 of the tread band 8.

Preferably, each annular shoulder portion L1, L2 of the tread band 8 has in turn an annular region S arranged at an axially greater position from the equatorial plane X-X of the tyre 1 having a void to rubber ratio substantially equal to zero (i.e. equal to zero or less than 0.2%), in other words in such axially outer annular regions S the grooves are substantially absent.

The invention is now illustrated by means of some Examples thereof that should be considered only for illustrative and not limiting purposes.

Properties of the Vulcanized Elastomeric Compositions

The following Table 2 shows the results of the dynamic mechanical analyses carried out on samples of the compositions used for the materials of the radially inner and radially outer portions of the tread band 8 of a tyre 1 according to the invention, as indicated in the previous Table 1.

These analyses were carried out at 70° C. and at a frequency of 10 Hz with the methods indicated above.

TABLE 2

|  | First elastomeric material (radially inner portion of the tread band or "base") | Second elastomeric material (radially outer portion of the tread band or "cap") |
|---|---|---|
| E' (MPa) | 4.92 | 4.65 |
| E" (MPa) | 0.81 | 1.25 |
| Tandelta (MPa) | 0.164 | 0.268 |
| E'/Tandelta (MPa) | 29.90 | 17.3 |

Tests on Tyres

The Applicant, in the search of a performance improvement took as a baseline of the comparative driving test the rear wheel tyre Pirelli Diablo Rosso™ III 190/55 ZR 17 that was and still remains a reference tyre greatly appreciated by the sports user.

The choice to carry out the tests on rear tyres was considered particularly challenging since in sports driving the rear tyre is thermally more stressed than the front tyre.

Both the tyre according to the invention, and the comparative tyre had a "cap-and-base" configuration of the tread band as illustrated above with reference to FIGS. 1-3.

The rubber compounds given in Table 1 with the mechanical features given in Table 2 were used to make the radially inner 13 and the radially outer 11 portions of the tread band of a Supersport tyre for a rear wheel of analogous size 190/55 ZR 17 with respect to the comparative tyre.

The tread band of the comparative tyre was made with the same second vulcanized elastomeric material according to the invention (see Table 1) in the radially outer portion 11 and with a vulcanized elastomeric material not according to that of the invention in the radially inner portion 13.

The following Table 3 shows the composition of the rubber compound that after vulcanization makes the first vulcanized elastomeric material of the radially inner portion 13 of the comparative tyre.

The ingredients used are those given in the previous Table 1.

TABLE 3

| First elastomeric material (radially inner portion of the tread band or "base") of the comparative tyre | |
|---|---|
| SSBR | 31 |
| BR | 95 |
| CB | 25 |
| Silica | 75 |
| Plasticizer | 8 |
| Resin | 25 |
| Wax | 1 |
| Anti-ozonant | 3 |
| Stearic acid | 2 |
| Zinc oxide | 3 |
| Silane | 6 |
| Accelerant | 3 |
| DPG | 2 |
| Soluble sulfur | 1.3 |

The following Table 4 shows the results of the dynamic mechanical analyses carried out on samples of the compositions used for the materials of the radially inner and radially outer portions of the tread band of the comparative tyre.

These analyses were carried out at 70° C. and at a frequency of 10 Hz with the methods indicated above.

TABLE 4

|  | First elastomeric material (radially inner portion of the tread band or "base") | Second elastomeric material (radially outer portion of the tread band or "cap") |
|---|---|---|
| E' (MPa) | 4.52 | 4.65 |
| E" (MPa) | 0.79 | 1.25 |
| Tandelta (MPa) | 0.170 | 0.268 |
| E'/Tandelta (MPa) | 25.93 | 17.3 |

Different testing sessions were carried out in a private motor-racing circuit by carrying out a series of maneuvers to test the grip and handling both on dry and wet ground. The evaluation of the driver is an average of the evaluations attributed in the various maneuvers.

In the test on a dry ground, the conditions were inflation pressure 2.9 bar; temperature of the asphalt of the track 38° C.; air temperature 24° C.

In the test on wet ground the conditions were: inflation pressure 2.9 bar; temperature of the asphalt of the track 14° C.; air temperature 14° C.

The test was carried out with a motorcycle of the "Super sport" range, model BMW S 1000 RR.

The following Tables 5 and 6 summarize the scores attributed by the test driver in the tests on dry and wet ground, respectively, for the various types of performance required of the tyre tested.

In the present case values have been attributed according to a scale from 1 to 5 (where in the scale the value 1 indicates a very unsatisfactory performance and the value 5 indicates an excellent performance).

TABLE 5

(test on dry ground)

| Tyres | Comparative tyre | Tyre according to the invention |
|---|---|---|
| Type of performance | | |
| warm-up optimization | 4.00 | 4.00 |
| Travel stability along a straight path | | |
| Stability in acceleration | 4.00 | 4.00 |
| Stationary stability | 4.00 | 4.00 |
| Travel stability along a bend | | |
| General stability of set up | 4.00 | 4.00 |
| Stability in acceleration | 4.00 | 4.00 |
| Characterization of Stability | | |
| Rear compactness | 3.85 | 4.00 |
| Driving Fundamentals | | |
| Readiness | 4.00 | 4.25 |
| General driving weight in soft handling | 4.00 | 4.25 |
| General driving weight in hard handling | 3.85 | 4.25 |
| Ease of driving | 3.85 | 4.25 |
| Transient driving homogeneity | 4.00 | 4.25 |
| Grip rear hard handling | 4.00 | 4.25 |
| Entry with pulled brakes | 3.75 | 4.15 |
| Combined thrust grip | 3.85 | 4.15 |

TABLE 6

(test on wet ground)

| Tyres | Comparative tyre | Tyre according to the invention |
|---|---|---|
| Type of performance | | |
| warm-up optimization | 4.00 | 4.00 |
| Traction along a straight path | | |
| Traction in acceleration | 4.00 | 4.00 |
| Traction in braking | 4.00 | 4.00 |
| Grip | | |
| Predictability\controllability | 4.00 | 4.00 |
| Feeling of contact | 4.00 | 4.15 |
| Feeling of safety | 4.00 | 4.15 |
| Driving Fundamentals | | |
| Lightness | 3.85 | 4.15 |
| Driving precision | 3.85 | 4.15 |
| Ease of driving | 3.85 | 4.15 |
| Transient driving homogeneity | 4.00 | 4.15 |
| Feeling of drainage/contact | 3.75 | 4.00 |

During the tests carried out, significant reductions of the lap times in the test circuits with the tyres according to the invention were also observed.

The results given in Tables 5 and 6 demonstrate that the tyre according to the invention achieved a better behaviour with respect to the already excellent comparative tyre on wet ground both for grip and handling, even for camber angles typically not reached on wet grounds.

The results given in Tables 5 and 6 also demonstrate that the tyre according to the invention also achieved a similar or even improved behavior in terms of performance on dry ground and, this, despite the high silica content considered more suitable in cold climates and when driving on wet ground.

Different modifications can be brought to the embodiments described in detail, still remaining within the scope of protection of the invention, defined by the following claims.

The invention claimed is:

1. A motorcycle tyre, comprising an equatorial plane and a tread band comprising:
   a radially inner portion comprising a first vulcanized elastomeric material obtained by vulcanizing an elastomeric material comprising 100 phr of at least one elastomeric diene polymer, from 30 phr to 130 phr of at least one reinforcing filler comprising an amount greater than 75%, by weight of the total weight of the reinforcing fillers, of an inorganic material selected from silica, alumina, silicates, hydrotalcite, calcium carbonate, kaolin, titanium dioxide, and mixtures thereof; and
   a radially outer portion comprising a second vulcanized elastomeric material obtained by vulcanizing an elastomeric material comprising 100 phr of at least one elastomeric diene polymer, from 30 phr to 130 phr of at least one reinforcing filler comprising an amount equal to or greater than 80% by weight of the total weight of the reinforcing fillers, of an inorganic material selected from silica, alumina, silicates, hydrotalcite, calcium carbonate, kaolin, titanium dioxide and mixtures thereof;
   wherein:
      a ratio (R1) between a dynamic elastic modulus and a tandelta measured at a frequency of 10 Hz and at 70° C. of the first vulcanized elastomeric material ranges between 27 and 35;
      a ratio (R2) between a dynamic elastic modulus and a tandelta measured at a frequency of 10 Hz and at 70° C. of the second vulcanized elastomeric material ranges between 15 and 30;
   wherein the ratio of R1/R2 is greater than or equal to 1.1, and
   wherein the radially inner portion extends interposed, along a radial direction, between a belt layer and the radially outer portion of the tread band of the tyre.

2. The motorcycle tyre according to claim 1, wherein a central annular portion of the tread band transversally extends along from 7%-15%, of an axial development of the tread band.

3. The motorcycle tyre according to claim 1, wherein a central annular portion of the tread band arranged astride the equatorial plane is substantially free of grooves.

4. The motorcycle tyre according to claim 1, wherein an annular shoulder portion of the tread band is substantially free of grooves.

5. The motorcycle tyre according to claim 1, wherein the tyre has a transversal curvature ratio, defined as a ratio between a distance of a top of the tread band from a line passing through axially opposite ends of the profile of the tread band, measured along an equatorial plane of the tyre, and a maximum cross section width of the tyre defined by the distance between the axially opposite ends of the tread band, of at least 0.30.

6. The motorcycle tyre according to claim 1, wherein the radially outer portion of the tread band comprises:
- a central sub-portion arranged astride the equatorial plane of the tyre and made of the first vulcanized elastomeric material; and
- a pair of lateral sub-portions, distal with respect to the equatorial plane of the tyre and arranged on opposite sides of the central sub-portion, and the lateral sub-portions made of the second vulcanized elastomeric material.

7. The motorcycle tyre according to claim 6, wherein the lateral sub-portions of the radially outer portion of the tread band are arranged at a distance from the equatorial plane of the tyre ranging from 15% to 25% of the axial half-development of the tread band.

8. The motorcycle tyre according to claim 1, wherein the tread band extends according to a defined axial development; and wherein the tread band comprises:
- two lateral annular portions arranged on opposite sides with respect to the equatorial plane of the tyre in an area of the tread band arranged at a distance from the equatorial plane of at least 7% of an axial half-development of the tread band, the lateral annular portions extending transversally along 45%-72% of the axial half-development of the tread band;
- a plurality of first groups of grooves, each group comprising a plurality of first grooves formed in the lateral annular portions and extending in part according to a substantially longitudinal direction and alternatively arranged on opposite sides of the equatorial plane of the tyre;
- a plurality of second groups of grooves, each group comprising a plurality of second grooves in the lateral annular portions obliquely arranged with respect to the equatorial plane of the tyre,
- wherein the plurality of first groups of grooves and the plurality of second groups grooves define in the lateral annular portions of the tread band:
- a void to rubber ratio ranging from 9% to 12%; and
- a plurality of blocks obliquely arranged with respect to the equatorial plane of the tyre,
- wherein a majority of the plurality of blocks defined between axially adjacent first and second grooves, circumferentially consecutive first and second grooves, or both, have an increasing size towards an annular shoulder portion of the tyre when in a direction opposite to a rolling direction of the tyre.

9. The motorcycle tyre according to claim 8, wherein the second plurality of grooves formed in the lateral annular portions and obliquely arranged with respect to the equatorial plane of the tyre comprises a circumferential sequence of groups of grooves, and wherein one or more of the grooves of the second plurality of grooves are tapered from the equatorial plane towards the shoulder portion of the tyre.

10. The motorcycle tyre according to claim 8, wherein the first plurality of grooves comprises a circumferential sequence of the second pairs of grooves with a substantially curvilinear course and wherein the grooves of the second pairs of grooves with a substantially curvilinear course are arranged at an average angle not less than 25° with respect to the equatorial plane of the tyre.

11. The motorcycle tyre according to claim 8, wherein the grooves of the second plurality of grooves obliquely arranged with respect to the equatorial plane of the tyre are arranged at an average angle not less than 30° with respect to the equatorial plane of the tyre.

12. The motorcycle tyre according to claim 8, wherein the first plurality of grooves extending in part according to a substantially longitudinal direction comprises a circumferential sequence of groove pairs tapered from the equatorial plane towards the shoulder portion of the tyre.

13. The motorcycle tyre according to claim 12, wherein the groove pairs extending in part according to a substantially longitudinal direction or the grooves obliquely arranged with respect to the equatorial plane of the tyre are tapered along a direction opposite to the preferential rolling direction of the tyre.

14. The motorcycle tyre according to claim 8, wherein the lateral annular portions of the tread band each comprise a first annular sub-portion axially proximal to the equatorial plane of the tyre and a second annular sub-portion axially distal with respect to the equatorial plane of the tyre, and wherein
- the first and second plurality of grooves define in the second annular sub-portions of the tread band a void to rubber ratio decreasing along the axial development of the tread band from the first annular sub-portion towards the corresponding annular shoulder portion of the tread band.

15. The motorcycle tyre according to claim 14, wherein the first annular sub-portion of the tread band transversally extends along 15%-30%, of the axial half-development of the tread band and has a void to rubber ratio ranging from 9% to 16%.

16. The motorcycle tyre according to claim 14, wherein the second annular sub-portion of the tread band transversally extends along from 30%-42%, of the axial half-development of the tread band and has a void to rubber ratio ranging from 3% to 8%.

* * * * *